Jan. 14, 1936.                H. HERMLE                2,027,865
                         REGENERATIVE BRAKING SYSTEM
                             Filed March 1, 1935
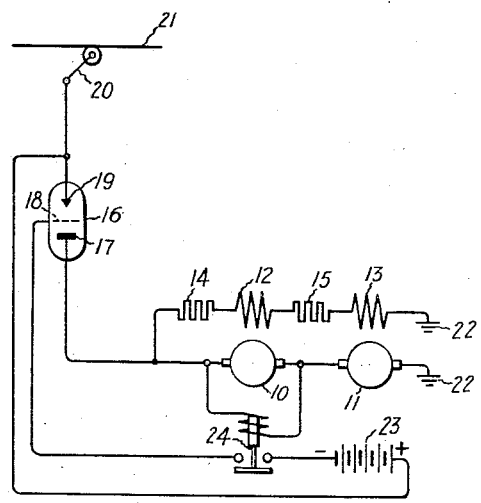
                                              Inventor:
                                          Hermann Hermle,
                                       by Harry E. Dunham
                                            His Attorney.

Patented Jan. 14, 1936

2,027,865

UNITED STATES PATENT OFFICE 2,027,865

REGENERATIVE BRAKING SYSTEM

Hermann Hermle, Berlin-Lankwitz, Germany, assignor to General Electric Company, a corporation of New York Application March 1, 1935, Serial No. 8,861
In Germany April 18, 1934

5 Claims. (Cl. 172—179)

My invention relates to regenerative braking systems of the general character shown by Letters Patent No. 1,976,562, Janisch, dated October 9, 1934, and has for an object the provision of a simple and reliable means for preventing the flow of current of large magnitude which may be caused by an undue rise of the motor voltage.

During regenerative operation of the traction motors of a vehicle the trolley or supply circuit may become deenergized or open circuited. For example, the supply circuit may be deenergized by the opening of a circuit breaker connected in the supply circuit, or the trolley may be moved onto a dead section of the supply line. Under such conditions the voltage of the traction motors, operating as generators, rises considerably. The rise in voltage is due in part to the speeding up of the vehicle and in part to an increase in the field excitation of the motors. Consequently, as soon as the trolley moves onto a live section of the supply circuit, or as soon as the supply circuit is again energized, the resultant current flow of large magnitude may cause damage to the motors.

In accordance with my invention in one form thereof, I provide a normally conductive valve between the supply circuit and the regenerative braking circuit, and operate in response to the motor voltage a control device to render the valve non-conductive whenever the motor voltage rises above a predetermined value. The control device also operates to render the valve conductive after the voltage of the motors has decreased below the predetermined value.

For a more complete understanding of my invention, reference should now be had to the accompanying drawing wherein I have shown diagrammatically a regenerative braking circuit embodying my invention.

Referring to the drawing, I have shown my invention in one form as applied to a pair of traction motors 10 and 11 provided, respectively, with field windings 12 and 13, resistors 14 and 15 being included in the field circuit. The regenerative braking current flows from the motors 10 and 11 through a suitable electric valve 16 provided with an anode 17, a grid or control electrode 18, and a cathode 19, and by a trolley 20 to a supply line 21, the motor current returning to the other side of the motors through the ground connection 22.

The valve 16, preferably of the type having an ionizable gaseous medium within its enclosing envelope, is capable of carrying currents of substantial magnitude. Valves of this type are well known to those skilled in the art.

Continuing with the description, it will now be assumed that the motors 10 and 11 are operating as generators to return current through the valve 16 to the supply circuit 21 and that the supply circuit is suddenly open circuited. Obviously, the flow of current from the regenerative circuit to the supply circuit is interrupted and the braking effort exerted by the motors 10 and 11 substantially disappears. The voltage of the motors 10 and 11 immediately begins to rise, this rise in voltage in part being caused by a loss of the IR drop or voltage drop in the motors themselves. The rise in voltage is further due to the increased speed of the vehicle caused by the loss of the braking effort. The total rise in voltage is of sufficient magnitude to produce a large flow of current, a current great enough to damage the motors, as soon as the supply circuit is again closed.

In order to prevent the flow of large magnitudes of current, I provide a source of supply such as a battery 23 arranged to be connected by a relay 24 for applying a negative bias to the control electrode or grid 18. The operating winding of the relay 24 is connected across the armature terminals of the motor 10 and is arranged to operate the relay contacts to closed position whenever the voltage of the motor 10 rises above a predetermined value. As long as the voltage is above this predetermined value, the negative bias applied by the source 23 to the grid 18 renders the valve 16 non-conductive to current flowing in either direction. Consequently, when the supply circuit 21 is completed no current can flow from the motors 10 and 11 until the motor voltage decreases below the predetermined value. Normally, the relay 24 is arranged to operate when the motor voltage exceeds by a substantial amount the voltage of the supply circuit.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:—

1. The combination with a regenerative braking circuit for a motor arranged to return power to a supply circuit, of an electric valve connected between said circuits and normally conductive to current flowing from said regenerative circuit to said supply circuit; and means responsive to a predetermined voltage of said motor for rendering said valve non-conductive.

2. The combination with a regenerative braking circuit for a motor arranged to return power to a supply circuit, of an electric valve connected between said circuits and normally conductive only to current flowing from said regenerative circuit to said supply circuit, and means operable when the voltage of said motor exceeds by a predetermined amount the voltage of said supply circuit for rendering said valve non-conductive.

3. The combination with a regenerative braking circuit for a motor arranged to return power to a supply circuit, of an electric valve connected between said circuits and normally conductive to current flowing from said regenerative circuit to said supply circuit, said valve normally preventing the flow of power from said supply circuit to said regenerative circuit irrespective of the voltage of said motor, and means operable whenever the voltage of said motor exceeds the voltage of said supply circuit by a predetermined amount for rendering said valve non-conductive.

4. The combination with a regenerative braking circuit for a motor arranged to return power to a supply circuit, of an electric valve provided with an anode, a cathode and a control electrode, means connecting said valve between said supply circuit and said motor, said valve normally being conductive for the flow of current from said motor to said supply circuit and non-conductive for the flow of current from said supply circuit to said motor, and means responsive to a predetermined rise in the voltage of said motor for applying a bias to said control electrode to render said valve non-conductive to the flow of current from said motor to said supply circuit.

5. The combination with a regenerative braking circuit for a motor arranged to return power to a supply circuit, of an electric valve provided with an anode, a cathode and a control electrode, means connecting said cathode to said supply circuit and said anode to said regenerative braking circuit, said valve normally being conductive to the flow of current from said regenerative circuit to said supply circuit and non-conductive to the flow of current from said supply circuit to said regenerative circuit, a relay provided with an operating winding, means connecting said winding in parallel with the armature of said motor, said relay being operable in response to a predetermined voltage of said motor, and supply means operable in response to the operation of said relay for applying a negative bias to said control electrode so as to render said valve non-conductive to the flow of current from said regenerative circuit to said supply circuit.

HERMANN HERMLE.